United States Patent
Cerny et al.

(10) Patent No.: US 9,903,787 B2
(45) Date of Patent: Feb. 27, 2018

(54) METHOD OF DETECTING AND LOCALIZING PARTIAL ROTOR-STATOR RUBBING DURING THE OPERATION OF A TURBINE

(71) Applicants: Doosan Skoda Power s.r.o., Plzen (CZ); Zapadoceska univerzita v Plzni, Plzen (CZ)

(72) Inventors: Vaclav Cerny, Plzen (CZ); Jindrich Liska, Plzen (CZ)

(73) Assignees: DOOSAN SKODA POWER S.R.O., Plzen (CZ); ZAPADOCESKA UNIVERZITA V PLZNI, Plzen (CZ)

( * ) Notice: Subject to any disclaimer, the term of this patent is extended or adjusted under 35 U.S.C. 154(b) by 296 days.

(21) Appl. No.: 14/103,514

(22) Filed: Dec. 11, 2013

(65) Prior Publication Data

US 2014/0230555 A1    Aug. 21, 2014

(30) Foreign Application Priority Data

Dec. 20, 2012    (CS) ...................................... 2012-947

(51) Int. Cl.
*G01M 13/04* (2006.01)
*F01D 11/20* (2006.01)
*F01D 19/00* (2006.01)
*F01D 21/00* (2006.01)
*F01D 21/04* (2006.01)
(Continued)

(52) U.S. Cl.
CPC ........... *G01M 13/045* (2013.01); *F01D 11/20* (2013.01); *F01D 19/00* (2013.01); *F01D 21/003* (2013.01);
(Continued)

(58) Field of Classification Search
CPC ..... G01M 13/04; G01M 13/045; F01D 19/00; F01D 21/003; F01D 21/04; F01D 25/04; F01D 25/164; F01D 11/20; F02C 9/28
(Continued)

(56) References Cited

U.S. PATENT DOCUMENTS 4,262,538 A * 4/1981 Otawara ................ G01H 1/003
                                                    73/593
4,478,082 A * 10/1984 Sato ....................... G01H 1/003
                                                    73/593
(Continued)

FOREIGN PATENT DOCUMENTS

EP    1 533 479 A2    5/2005

OTHER PUBLICATIONS

Application of Full Spectrums and Other Vibration Two-Dimensional Characteristics for Gas Transportation Units Condition Monitoring; Felix Balitsky, et al.; Machinery Engineering Research Institue, Russian Academy of Science; Moscow, 2010.
(Continued)

*Primary Examiner* — Hezron E Williams
*Assistant Examiner* — Rose M Miller
(74) *Attorney, Agent, or Firm* — Sughrue Mion, PLLC

(57) ABSTRACT

The rotor of the turbine is monitored by sensors of the rotor vibrations arranged in at least one plane of measuring perpendicular to the axis of the rotor and by sensors of the absolute vibrations of the bearings. When using this method of processing, synchronically digitalized signals of the sensors of rotor vibrations, first the arithmetic mean of the individual harmonic bands in full spectrum in the frequency domain is calculated, by which means the information about the subharmonic components and their multiples in the full spectrum of these signals is transferred into the frequency band −1X to 1X, at the same time is by the calculation of the median estimated the level of the signal noise, with which individual frequency bands of the full spectrum are encumbered, and which is subtracted from the amplitudes in the individual frequency bands of full spectrum of the signals of the sensors.

8 Claims, 5 Drawing Sheets

(51) Int. Cl.
F01D 25/04 (2006.01)
F01D 25/16 (2006.01)
F02C 9/28 (2006.01)
G01M 15/14 (2006.01)
G01H 1/00 (2006.01)

(52) U.S. Cl.
CPC .............. *F01D 21/04* (2013.01); *F01D 25/04* (2013.01); *F01D 25/164* (2013.01); *F02C 9/28* (2013.01); *G01H 1/006* (2013.01); *G01M 15/14* (2013.01)

(58) Field of Classification Search
USPC .......................................... 73/593, 659, 660
See application file for complete search history.

(56) References Cited

U.S. PATENT DOCUMENTS

2005/0114082 A1* 5/2005 Kant ..................... F01D 21/003
702/183
2008/0240902 A1 10/2008 Cooper
2009/0003991 A1 1/2009 Andarawis et al.
2009/0314092 A1* 12/2009 Twerdochlib .......... G01H 1/006
73/659

OTHER PUBLICATIONS

Full Annular Rub in Mechanical Seals, Part I: Experimental Results, Bentley, et al.; Feb. 7, 2001.
Application of full spectrum to rotating machinery diagnostics; Goldman, et al. Shaft Centerlines, Orbit, First Quarter 1999.
Forward and Backward Precession of a Vertical Anisotropically Supported Rotor, Journal of Sound and Vibration, Jul. 14, 1995; Muszynska.
Dynamics of Anisotropically Supported Rotors, Muszynska, et al.; International Journal of Rotating Machinery, 1997, vol. 3, No. 2, pp. 133-142; Jun. 14, 1996.
Rotordynamics; Taylor & Francis Group; Muszynska, Copywrite 2005 by Taylor & Francis Group, LLC, Table of contents and 62-68 only.
Using Full Spectrum Plots; Machinery Messages; Part 2; Jun. 1994.
Balancing with the presence of a rub; Peton; Jan. 1, 2011; EDP Sciences in Mecanique & Indutries.

* cited by examiner

METHOD OF DETECTING AND LOCALIZING PARTIAL ROTOR-STATOR RUBBING DURING THE OPERATION OF A TURBINE

CROSS-REFERENCE TO RELATED APPLICATIONS

This application claims priority from Czech Republic Patent Application No. PV 2012-947, filed on Dec. 20, 2012, in the Czech Republic Intellectual Property Office, the disclosure of which is incorporated herein by reference in its entirety.

TECHNICAL FIELD

The invention relates to a method of detecting and localizing partial rotor-stator rubbing during the operation of a turbine, in which the turbine rotor is monitored by means of at least one pair of sensors of rotor vibrations located in one plane of measuring perpendicular to the rotor axis.

BACKGROUND ART

During the operation of steam as well as gas turbines, in some situations, such as during the start-up of a turbine, when the rotor is overcoming its natural frequencies and its vibrations are, as a rule, at the highest level, undesirable rubbing between the stator and the rotor may occur ("rotor-stator rub" or "rubbing"). In the first phase of this rubbing it is especially the seals arranged between the rotating and statical parts of the turbine that are abraded, and, as a result, the amount of leaking medium increases and the turbine efficiency decreases. In cases when rotor-stator rubbing is not detected in time and is not eliminated by an appropriate intervention of the machine operator, such as by changing the running speed during the start-up or run-down, or by changing parameters of the jacking oil during the operation on a turning gear, both the rotor and the stator may be heavily damaged, or an breakdown of the whole turbine leading to considerable economic damage may occur.

The rotor-stator rubbing may be either partial, when the rubbing between the rotor and the stator is brief, but at least several times repeated, or it is full rubbing, i.e. a continuous or almost continuous rubbing between the rotor and the stator. Nevertheless, the full rotor-stator rubbing is always preceded, at least for a short time, by the partial rotor-stator rubbing.

At present, detection of the partial rotor-stator rubbing is based especially on offline analysis of vibration signals, when during the measurements the machine operator monitors the overall level of vibrations as well as the phasor of the first harmonic component of the rotational frequency in vibration signals. If a step change occurs in overall vibration, or in rotation of the phasor of the first harmonic component with variable or periodically varying amplitude, rotor-stator rubbing is detected, and after terminating the measurements a detailed data analysis is carried out with the purpose of excluding the possibility of false positive detection. Therefore this approach is not suitable for detecting rotor-stator rubbing during the real operation of the turbine and can only be used for laboratory research or experimental purposes.

Another approach for detecting partial rotor-stator rubbing is based on the fact that apart from the change in the phasor of the first harmonic component of the vibration signals, the rubbing is also accompanied by formation of subharmonic spectral components, whose frequency corresponds to the frequency of impacts of the rotor on the stator. Nevertheless, the disadvantage of detecting rotor-stator rubbing based on monitoring these subharmonic components is the fact that the frequencies of some of them are too close to frequencies indicating other defects, such as the instability of the oil film in the slide bearing, etc., which may result in false positive detection of rotor-stator rubbing, or, on the contrary, in wrong interpretation of expresses of this rubbing as defects of different type.

Furthermore, from patent and non-patent literature there are known also other methods of detecting and/or localizing partial rotor-stator rubbing based on entirely different principles.

For example EP 1533479 discloses a method of detecting and/or localizing rotor-stator rubbing, in which operating characteristics of the turbine are monitored, such as the housing temperature, the rotor excentricity, pressure in the condenser and the generator load. Simultaneously, a corresponding algorithm independently analyzes the change of individual characteristics and if an abnormal change, or a step change in one of the characteristics occurs, this change is interpreted as a side-effect accompanying rotor-stator rubbing. The drawback of this method is that a step change in the monitored characteristic may relate to other phenomena or defects which occur during the operation of the turbine, therefore there is very high probability of false positive detection of rotor-stator rubbing. Considering the dynamics of the monitored characteristics and assumed sensitivity of the algorithm used, it is moreover impossible to regard the analysis of the change of these characteristics and the subsequent detection of rotor-stator rubbing as a sufficiently fast method which could be actually employed during the operation of a turbine.

From US 2008240902 a method of detecting rotor-stator rubbing is known which consists in monitoring the temperature of the turbine stator at least on part of its circumference, wherein possible local increase in temperature is attributed to the friction between the rotor and the stator and is evaluated as the presence of the rotor-stator rubbing. Also, according to the positioning of the temperature sensor which has registered the increase in temperature, it is possible to roughly localize the place of the rubbing on the stator. The shortcoming of this method is that at the moment when, as a result of friction between the rotor and the stator, sufficient amount of heat is produced to be registered by the temperature sensor, a period of time can pass since their first contact—a period that could last in the order of minutes, during which the rotor, stator, or possibly other parts of the turbine may be already seriously damaged, and it is impossible to prevent the stator from bending in any other way than by the machine shutdown. Another disadvantage is that in case of serious rotor-stator rubbing which occurs along the entire circumference of the stator or its larger part, the increase in temperature of the stator is registered substantially uniformly by most or all the temperature sensors located in the stator and due to this it does not have to be always classified as rotor-stator rubbing. Furthermore, a major disadvantage is the fact that additional installation of plurality of temperature sensors in the body of the turbine stator requires the turbine shutdown and relatively large investments.

In addition, US 20090003991 describes a method of detecting rotor-stator rubbing, which consists in continuous measurements of the distance of the rotor blades from the stator and/or the height of the rotor blades. Similarly to the preceding case, the drawback of this method is the necessity of additional installation of special sensors in the turbine stator and increased overall costs related to it. Although it is possible to detect rubbing between the blade and the stator by measuring the space between the rotor blade and the blade seal in the stator, real probability of successful and prompt detection of rotor-stator rubbing by means of this method is extremely low due to the fact that clearances between the blade and the stator are larger than those between the shaft and the stator and, therefore, rotor-stator rubbing occurs primarily on the turbine shaft. A further disadvantage is possible false positive detection of rotor-stator rubbing upon the change in the parameter sensed by sensors, which could be also caused by another factor, for instance it could result from rotor eccentricity, change of its rotational speed, etc.

The goal of the invention is to eliminate the disadvantages of the background art and propose a new method of detecting partial rotor-stator rubbing during the operation of a turbine, which would eliminate shortcomings of the prior art and would enable to detect rotor-stator rubbing in real time, as soon as possible after it occurs, and at the same time to localize it as precisely as possible.

SUMMARY

The goal of the invention is achieved by a method of detecting and localizing partial rotor-stator rubbing during the operation of a turbine, in which the rotor of the turbine is monitored by at least one pair of sensors of rotor vibrations situated in one plane of measuring perpendicular to the rotor axis and by at least one pair of sensors of absolute vibrations of bearings. The principle of the invention consists in that with the synchronically digitalized signals of the sensors of the rotor vibrations the arithmetic mean of individual harmonic bands in the full spectrum in the frequency domain is calculated, by which means the information about the subharmonic components and their multiples in the full spectrum of these signals is converted to the frequency band −1X to 1X (where X indicates rotor rotational frequency), at the same time by calculation of the median is estimated a level of the signal noise with which the individual frequency bands of the full spectrum are encumbered and which is subtracted from the amplitudes in the individual frequency bands of the full spectrum of the signals of the sensors, wherewith the normalized accumulated full spectrum of the signals of the sensors of the rotor vibrations is created, in which the amplitude of the predetermined subharmonic component/components of the signals of the rotor vibrations is compared with the amplitudes of the surrounding frequency components, determined by the Fourier transform or by approximation with the aid of the Fourier series. Furthermore, on the basis of visual and/or automatic analysis it is possible to deduce the presence of monitored subharmonic component of the signals of the rotor vibrations in the spectrum of these signals, on basis of which subsequently the occurrence of rotor-stator rubbing is detected.

In case rotor-stator rubbing occurs the place/places where the rubbing takes place is/are further localized. When using the method of axial localization sections of the signals of the sensors of the absolute bearing vibrations of the turbine are processed in the time of the beginning of rotor-stator rubbing or during the rubbing in the time-frequency domain, in which broadband amplitude increases in these signals are identified and subsequently periods of the increase in broadband amplitudes of these signals above the level of the signal noise are defined, and on the basis of knowledge of these periods and their time variances, the distribution of the sensors of the absolute bearing vibrations, the spreading speed of the impact in the material of the rotor/stator, the axial position of the place/places of rotor-stator rubbing is determined with help of axial localization, and, by comparison of the histogram of the absolute frequencies of these places with the drawing or the turbine axis, the axial position of the place/places where the rotor-stator rubbing actually occurs. For circumferential localization of rotor-stator rubbing, increases in the amplitudes of the signals of the sensors of the absolute bearing vibrations are visualized in the orbit of the first harmonic component of the rotor rotational frequency formed from the signals of the sensors of the rotor vibrations, by which means the angular position of the maximum of the increases in amplitudes caused by the rotor-stator rubbing is determined, whereby the angular position corresponding to that of the place/places where the rotor-stator rubbing occurs.

Moreover, it is favourable to use sensors of relative rotor vibrations, which are standard part of the field instrumentation of turbines. Apart from them, or in combination with them, however, sensors of absolute rotor vibrations can also be used.

In visual analysis the amplitude of the predetermined subharmonic component/components of the signals of the rotor vibrations in the interval from 1/9X to 1/2X is monitored and compared with the amplitudes of the frequency components within its proximity, whereby the presence of the monitored subharmonic component/components in the spectrum of the signals of the sensors of the rotor vibrations, and the occurrence of rotor-stator rubbing is detected if the amplitude of this/these subharmonic component/components exceeds those of the surrounding frequency components.

In automatic analysis is with advantage determined a characteristic value of the subharmonic components having frequencies equaling integral fractions of the rotational speed of the rotor, whereby in case when the rotor-stator rubbing does not occur, this characteristic value of the given subharmonic component assumes a value close to 1, and if the rotor-stator rubbing does occur, the assumed value of this characteristic value of the given subharmonic component exceeds 1.

If the rotor-stator rubbing does not occur, it is possible to regard the characteristic value as an incidental value and approximate it by summation of its mean value $\mu$ and its standard deviation $\sigma$ computed by recursive algorithm. The existence of rotor-stator rubbing is then detected on the basis of the change of the mean value $\mu$ and the standard deviation $\sigma$.

In axial localization of the place/places of rotor-stator rubbing sections of the signals of the sensors of the absolute bearing vibrations of the turbine in the time of the beginning of, or during rotor-stator rubbing, are with advantage processed by the wavelet transform, in which the Morlet wavelet is applied as a basic function.

SPECIFIC DESCRIPTION

Figure 1:
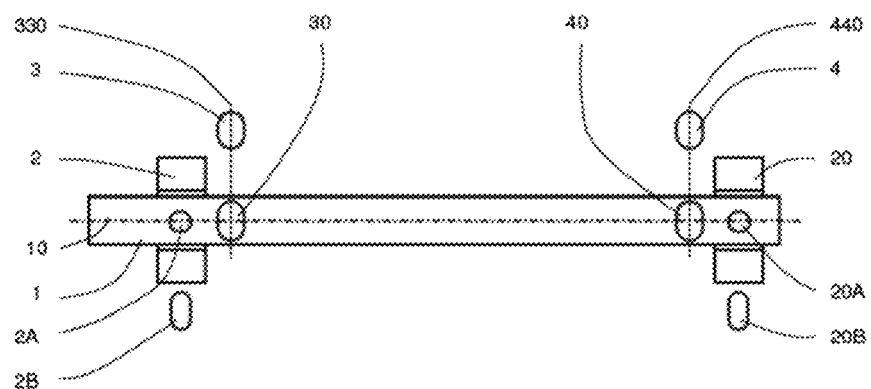
FIG. 1 schematically represents the shaft of a turbine without blades and other construction elements, on which the method of detecting partial rotor-stator rubbing during the operation of the turbine according to the invention is applied.

The method of detecting partial rotor-stator rubbing during the operation of the turbine and its subsequent localization according to the invention will be described on the example of a turbine schematically shown in FIG. 1. The rotor 1 of the turbine is rotatably mounted in two radial bearings 2 and 20, whereby in the proximity of each of them there is a pair of sensors 3, 30 and 4, 40 of relative rotor vibrations. Each pair is placed in the common plane of measuring 330 and 440 perpendicular to the axis 10 of the rotor 1, in the identical distance from it, and the sensors 3, 30 and 4, 40 are in the corresponding plane of measuring 330, or 440 mutually shifted, preferably by the angle of 90°. In addition, the radial bearings 2 and 20 of the turbine are monitored by sensors 2A, 2B and 20A, 20B of absolute vibrations of these bearings. All these sensors are standard part of the field instrumentation of turbines, and so the method of detecting partial rotor-stator rubbing during the operation of the turbine and its localization according to the invention does not require additional installation of any special components. Another advantage of this method is that it enables detecting rotor-stator rubbing online in real time, practically immediately after its onset.

The signals of the sensors 3, 30, 4, 40 of relative rotor vibrations can be in other variants supplemented and/or replaced with signals of not shown sensors of absolute rotor vibrations, which, however, in currently installed turbines are not used as standard in pairs, or are not used at all, and so in that case it is necessary to fit the turbine, or, more specifically, the stator with these sensors.

For further processing it is always the signals of at least one of the pairs of the sensors 3, 30 and/or 4, 40 of rotor vibrations arranged in one plane of measuring 330, 440 that are used. Furthermore, the signals of the sensors 3, 30 and/or 4, 40 are synchronically digitalized in not shown, well-known ND converter/converters.

The digital signals of the sensors 3, 30, 4, 40 of rotor vibrations created in this manner are subsequently used for detecting the existence, or non-existence of subharmonic components having frequencies equal to integral fractions of the rotational frequency of the rotor 1 in their spectrum, as these components are an apparent side-effect of partial rotor-stator rubbing. In case of the presence of such components it is advantageous to monitor their frequency which indicates the intensity of the rotor-stator rubbing.

The fundamental method of detecting the subharmonic components of the signals of the sensors 3, 30, 4, 40 of rotor vibrations in their spectrum is monitoring the changes of amplitudes of these components in full spectrum. These amplitudes are with advantage determined by the Fourier transform of the signals of the sensors 3, 30, 4, 40 of rotor vibrations or on the basis of approximation of these signals by the Fourier series. The amplitudes obtained in this manner are subsequently compared with the predetermined threshold (see the characteristic value below), whereby in case it is exceeded, the presence of partial rotor-stator rubbing is detected.

Figure 2:
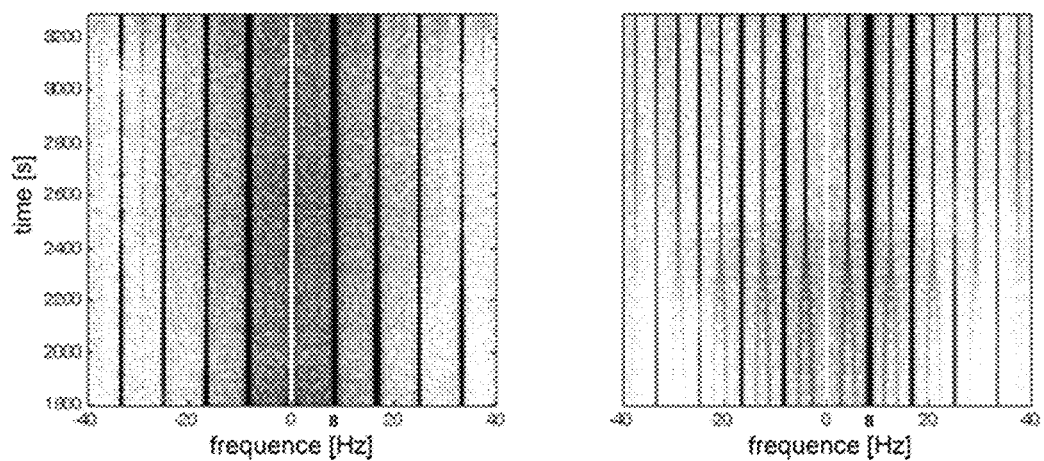
FIG. 2 represents an example of complete spectrogram of the signals of the sensors of relative rotor vibrations arranged in two different planes of measuring.
Figure 3:
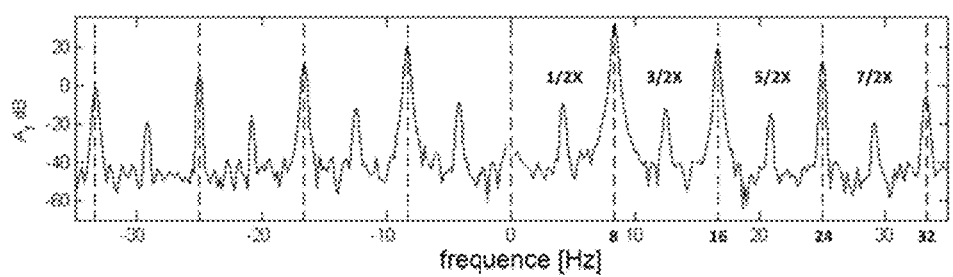
FIG. 3 represents an example of development of full spectrum calculated from the signals of the sensors of relative rotor vibrations arranged in one of the planes of measuring.

Due to the fact that partial rotor-stator rubbing has usually variable intensity, which express itself by the change of the frequency of the subharmonic components of the signals of the sensors 3, 30, 4, 40 of rotor vibrations, for example from 1/3 and 2/3 of the rotational frequency of the rotor 1 (in the particular example rotational frequency is 8 Hz) to 1/2 of the rotational frequency of the rotor 1, which is clear for instance from the right part of FIG. 2 (for the plane of measuring 330), whereas other subharmonic components of the signals of the sensors 3, 30, 4, 40 of rotor vibrations have frequency for example in the range of −3 to −4 multiples of the rotational frequency of the rotor 1—see the left part of FIG. 2 (for the plane of measuring 440), it is advisable to transfer the information about the subharmonic components in full spectrum of the signals of the sensors 3, 30, 4, 40 of the rotor vibrations from this broad frequency band into narrower interval and monitor their presence, or their behaviour in it. For example, it is favourable to use the interval between −1X and 1X (where X refers to the rotational frequency of the rotor 1), which allows to determine the type of subharmonic component of the signals of the sensors 3, 30, 4, 40 of rotor vibrations with respect to the rotational frequency of the rotor 1. The key components for detecting rotor-stator rubbing are the components having frequencies equal to integral fractions of the rotational frequency of the rotor 1. FIG. 3 represents graphically an example of the development of full spectrum computed from the signals of the sensors of rotor vibrations in the plane of measuring 440, whereby the values of amplitude spectrum are presented in decibels. The spectrum is then divided with vertical dashed lines into frequency intervals according to the multiples of the rotational frequency of the rotor 1, wherein, as can be seen, the subharmonic components of the spectrum and their multiples are contained in all these frequency intervals. Specifically, in the represented example of embodiment there are components of signals having frequencies equal to 1/2X and their integral multiples (in FIG. 3 denoted by the values from 1/2X to 7/2X). For the purpose of the transfer of the information about the subharmonic components of signals into narrower frequency interval, the method of accumulated full spectrum of signals can be applied with advantage.

The accumulated full spectrum of signals can be expressed by the following formula:

$$A_{af}(t, \pm\omega) = \frac{1}{N_a} \sum_{k=0}^{N_a-1} A_f(t, \pm\omega_k),$$

$$\omega_k = (k\omega_r(t), (k+1)\omega_r(t)),$$

where $A_{af}(t,\pm\omega)$ is accumulated full spectrum in time t, $A_f(t,\pm\omega)$ is full spectrum in time t, $\omega_r(t)$ is the rotational frequency of the rotor 1 in time t, and $N_a$ is the number of intervals, into which the left and right part of full spectrum have been divided (FIG. 3). Considering long-term experience with the sensors used especially as sensors of relative rotor vibrations and with experimental verifying, it is advantageous to select $N_a$ in the interval between 5 and 10.

Thus calculation of accumulated full spectrum consists in computing the arithmetic mean of the harmonic frequency bands of the signals of the sensors 3, 30, 4, 40 of the rotor vibrations from the full spectrum in the frequency domain, and enables to identify the relation of the subharmonic components of these signals to the rotational frequency of the rotor 1. Its principle is to reveal multiples of the basic subharmonic components of the signals, which can be identified in higher bands, but in the baseband from 0X to ±1X their identification becomes more difficult or even impossible due to the presence of signal noise.

Figure 4:
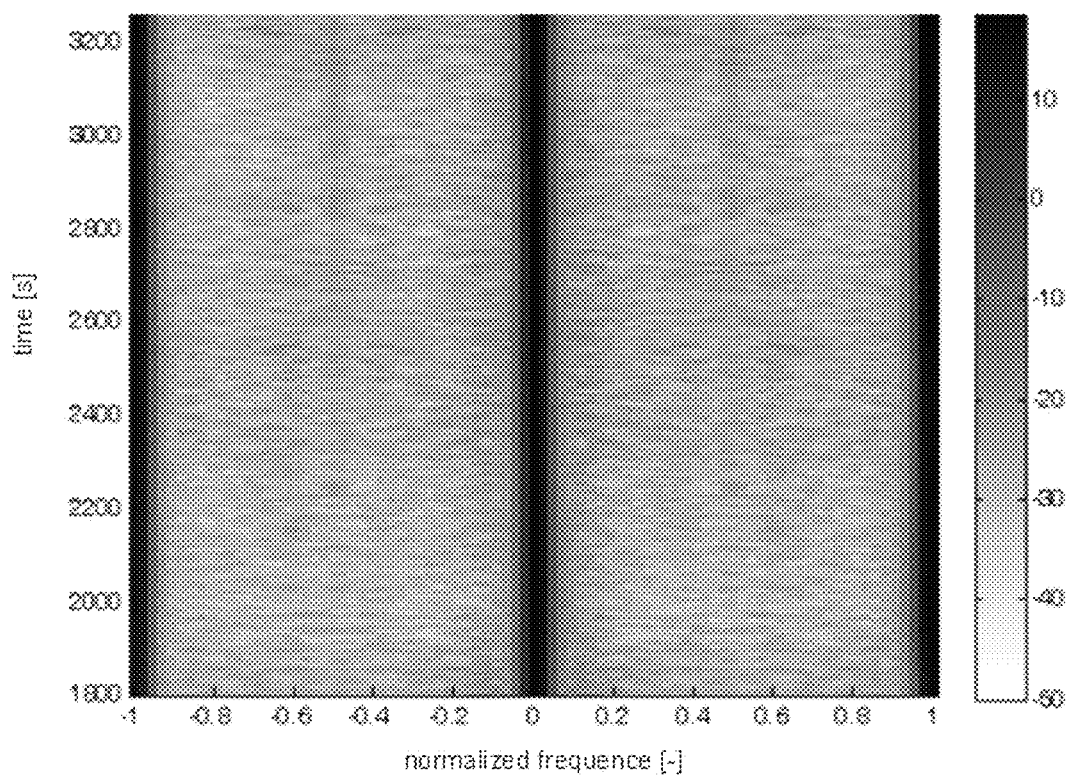
FIG. 4 represents an example of spectrogram of accumulated full spectrum computed from the signals of the sensors of relative rotor vibrations arranged in one of the planes of measuring.

As is apparent from the illustration of the spectrogram of accumulated full spectrum, which is for the plane of measuring 330 shown in FIG. 4, there is a possibility that during its calculation the information about the presence of the subharmonic components of the signals of the sensors 3, 30, 4, 40 of the rotor vibrations at higher frequencies will be almost completely lost.

Figure 5:
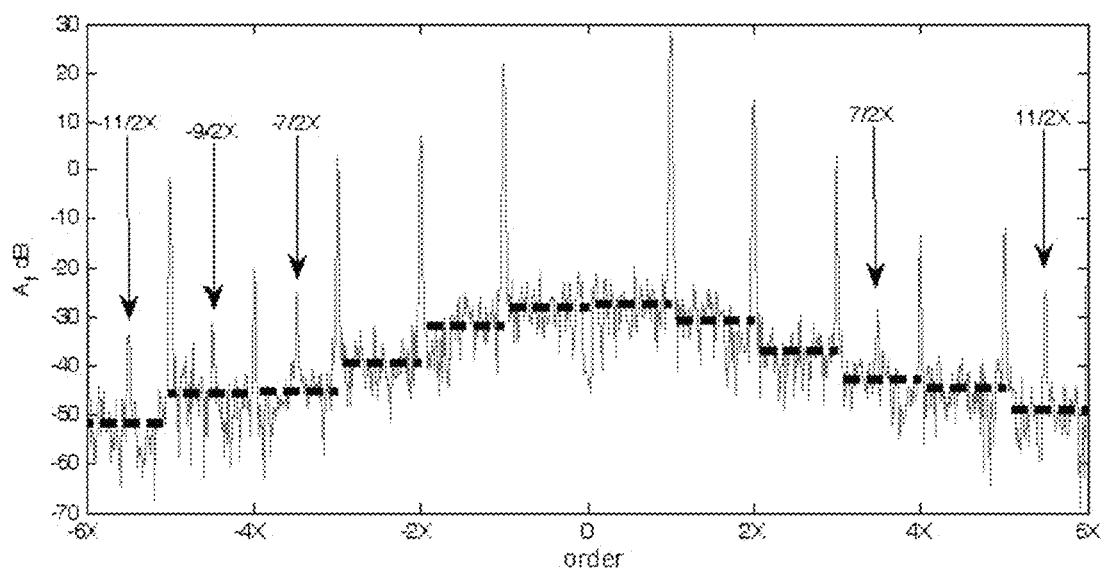
FIG. 5 represents development of full spectrum of the signals of the sensors of relative rotor vibrations according to the left part of FIG. 2 in the order domain.

FIG. 5 further shows development of full spectrum calculated from the signals of the sensors 3, 30 or 4, 40 of rotor vibrations, from which it is evident that the signal noise reaches in the interval between −3X and 3X almost the same level as the amplitudes of multiples of the subharmonic components of the signals, and so in this band the components having frequencies 1/2X, 3/2X and 5/2X are not visible and visible are only the components having frequencies from 7/2X, or −7/2X, as they are not overlapped by the signal noise.

Figure 6:
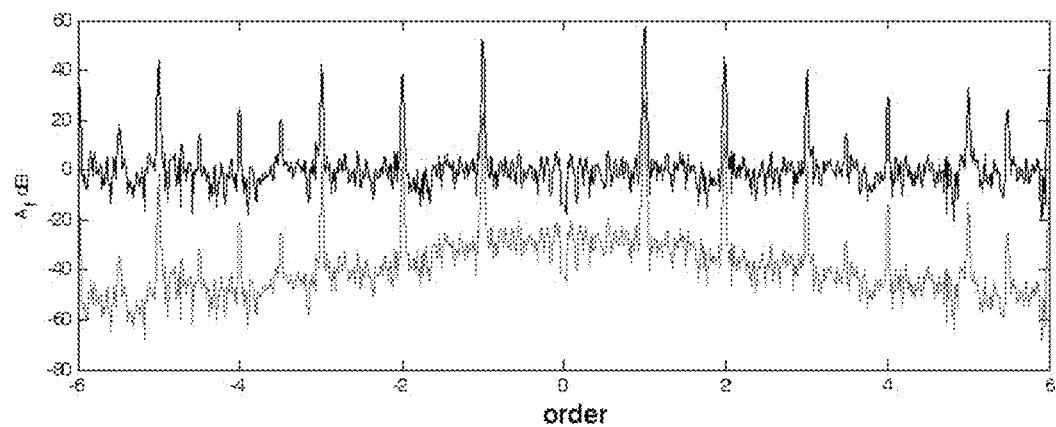
FIG. 6 represents a comparison of development of full spectrum of the signals of the sensors of relative rotor vibrations according to FIG. 5 with the development of normalized full spectrum of the signals of the sensors of relative rotor vibrations in the order domain.

In order to reduce the level of signal noise in individual frequency bands the full spectrum is further normalized. During this process, by calculating the median of signal noise (shown with a dashed line in FIG. 5) for individual frequency bands of full spectrum, the signal noise level is estimated. This median is afterwards subtracted from the amplitudes in individual frequency bands of the full spectrum. From comparison of full spectrum (lighter lower curve in FIG. 6) with normalized full spectrum, i.e. full spectrum with suppressed signal noise (upper curve in FIG. 6), it is clear that full spectrum has been "straightened" by normalizing and its subharmonic components are visible more distinctly.

Figure 7:
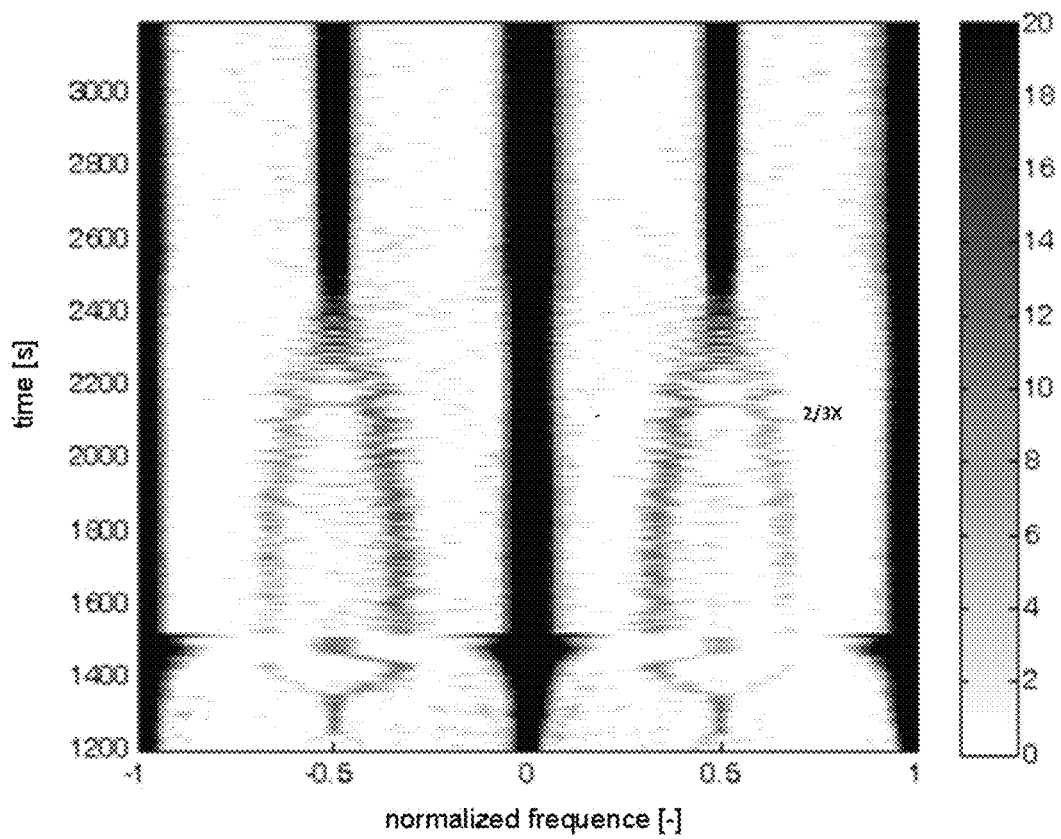
FIG. 7 represents an example of spectrogram of normalized accumulated full spectrum calculated from the signals of the sensors of relative rotor vibrations in one of the planes of measuring.

Accordingly, when applying the method of detecting partial rotor-stator rubbing during the operation of a turbine according to the invention, first full spectrum of the signals of the sensors 3, 30, 4, 40 of rotor vibrations at each time point is accumulated, or, more specifically, averaged in the frequency domain, and simultaneously it is normalized, that is the estimated signal noise level in individual frequency bands is subtracted from it, which results in the formation of normalized accumulated full spectrum of the signals of the sensors 3, 30, 4, 40 of rotor vibrations, the exemplary spectrogram of which for the plane of measuring 330 and for the sensors 3 and 30 of the rotor vibrations is graphically represented in FIG. 7. From its development it can be seen that during the operation of the turbine partial rotor-stator rubbing occurred—see the subharmonic components with the frequencies ±1/2X, ±1/3X and ±2/3X present in the spectrogram.

The spectrogram of normalized accumulated full spectrum, moreover, appears in real time on a monitor or display, or is printed, while the machine operator observes the amplitude of particular subharmonic component (or more subharmonic components) of the signals of rotor vibrations (e.g. 1/9X to 1/2X). If the amplitude of particular subharmonic component/components increases, the operator detects the occurrence of rotor-stator rubbing. In that case the operator performs steps to suppress the rubbing or shuts the turbine down.

This diagnostic procedure can be further automatized by monitoring the development of characteristic value of subharmonic components of the signals of the sensors 3, 30, 4, 40 of rotor vibrations with frequencies equal to integral fractions of the rotational frequency of the rotor 1, defined as follows:

$$\xi_{sf}(t) = \max\left[\frac{A_{caf}(t, -s_f)}{\frac{1}{M}\sum_{k=1}^{M} A_{caf}(t, -\tilde{f}_k)}, \frac{A_{caf}(t, s_f)}{\frac{1}{M}\sum_{k=1}^{M} A_{caf}(t, \tilde{f}_k)}\right]$$

where $A_{caf}(t, \pm s_f)$ is the amplitude of normalized accumulated full spectrum for the subharmonic frequency $s_f$ in time t and $A_{caf}(t, \pm \tilde{f}_k)$ indicates the amplitude of the frequency line in proximity of this frequency in the time t, M is the overall number of frequency lines, which are applied for averaging, k is the index of the sum and $\tilde{f}_k$ indicates the frequency line which is situated in the proximity of the subharmonic frequency $s_f$.

The characteristic value is compared with predetermined threshold value, the exceeding of which is an express of presence of partial rotor-stator rubbing. This threshold value is always selected as higher than 1 (typically 2) and thus indicates a factor by which the amplitude of the subharmonic component of the signals exceeds the amplitude level of the frequency lines in close proximity. If rotor-stator rubbing does not occur and therefore the subharmonic component of the signals of the rotor vibrations is not contained in the signals, and neither are contained its multiples, the characteristic value for the given subharmonic component assumes value close to 1. The presence of the particular subharmonic component in the signals then causes that the characteristic value exceeds value 1 and selected threshold value.

Figure 8:
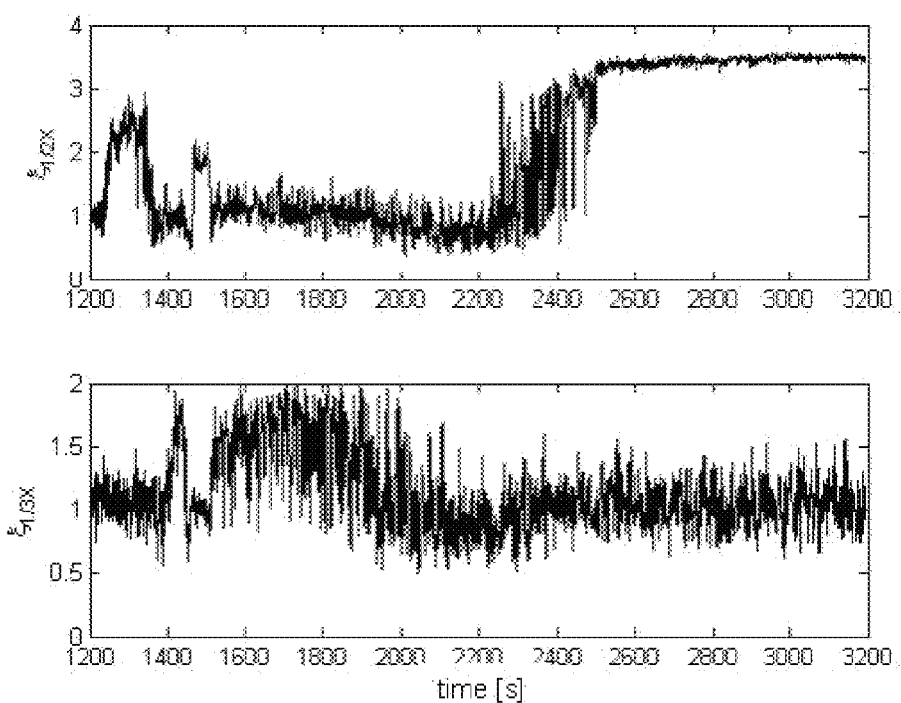
FIG. 8 represents an example of development of the characteristic values for the subharmonic frequencies equal to 1/2 and 1/3 of the rotational frequency of the rotor.

From development of the characteristic value of the subharmonic components of a signal with frequencies equaling integral fractions of the rotational frequency of the rotor 1 in FIG. 8, which shows development of the characteristic value for the frequencies 1/2X a 1/3X, their high fluctuation is apparent. In case rotor-stator rubbing is not present, the characteristic value can be regarded as an incidental value, determined by its mean value and the standard deviation.

Development of the characteristic value can be then approximated by summation its mean value and the standard deviation, whereby its upper envelope is acquired in the form:

$$\xi_{sf}up(t)=\mu(t)+\sigma(t)$$

where μ(t) is the mean value of the characteristic value and σ(t) is the standard deviation of the characteristic value.

The mean value and the standard deviation, however, must be—due tononstationarity of the characteristic value—determined by the recursive algorithm:

$$\mu(k)=\lambda\cdot\mu(k-1)+(1-\lambda)\cdot\xi_{sf}(k)$$

$$\sigma^2(k)=\lambda\cdot\sigma^2(k-1)+1-\lambda)\cdot[\xi_{sf}(k)-\mu(k)]^2,$$

where λ represents the forgetting factor and with respect to the sampling frequency of signal and selected time constant t it is chosen in most cases in the interval from 0.9 to 0.9999, k is a step and therefore it increases by 1 with every signal sample.

The forgetting factor λ can be expressed by the relation $$\lambda = 1 - \frac{1}{f_s, t}$$

where $f_s$ is the sampling frequency of a signal and t is the selected time constant.

This algorithm also serves as a filter, since in case rotor-stator rubbing occurs, the mean value changes, as well as the standard deviation, which is evident from FIG. 8, or, specifically, from its lower part, where for instance within the time interval between 1400 s and 1500 s rotor-stator rubbing occurred.

Figure 9:
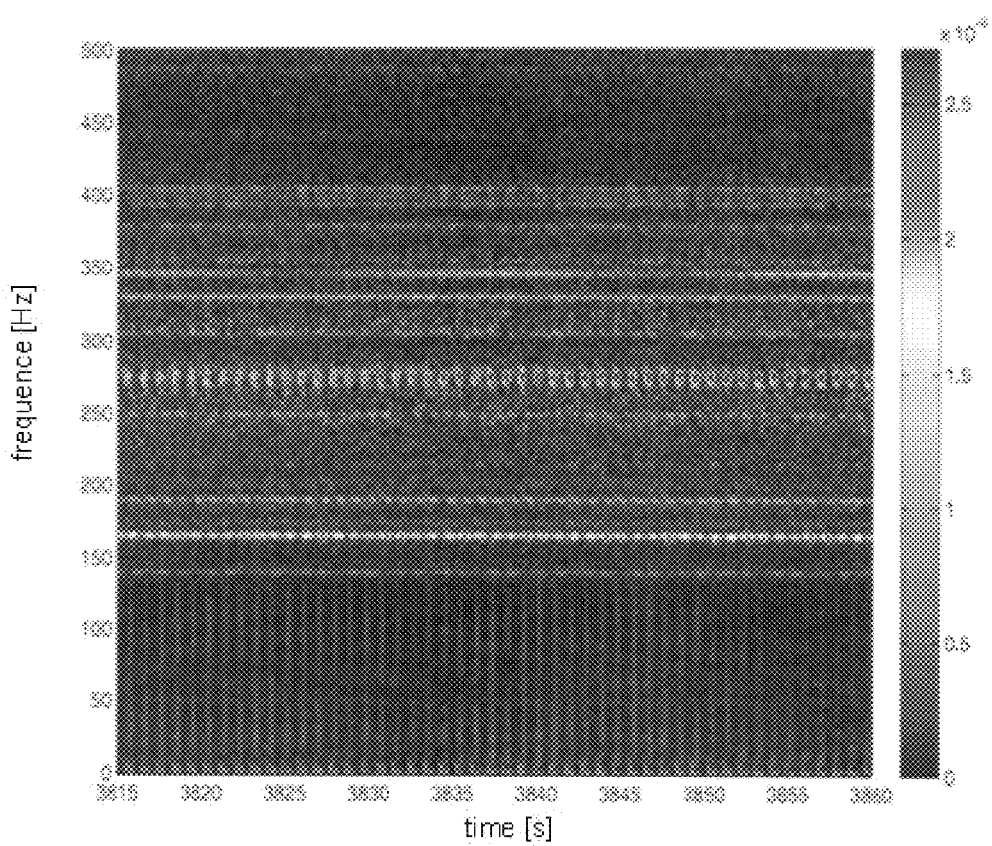
FIG. 9 represents an example of complete spectrogram of the spectrum of the signals of the sensors of absolute vibrations of bearings of the turbine in the time of beginning of rotor-stator rubbing.

After positive detection of rotor-stator rubbing its localization follows, that is determining the place/places on the machine, where the rubbing occurred, or occurs. For axial localization of this place/these places signals of sensors 2A, 2B and 20A, 20B of the absolute vibrations of the bearings 2, 20 of the turbine (which are standard part of the field instrumentation of turbines) are used, whereby sections of these signals in the time of beginning, or during rotor-stator rubbing, are processed in the time-frequency domain. Simultaneously, broadband amplitude increases (impacts) in the spectrum of these signals are identified and subsequently, according to their nature, the frequency band where these impacts are sufficiently visible is determined, and in this band they are further processed (for example, any frequency band between the frequencies 0 Hz and 150 Hz or 250 Hz and 300 Hz in the spectrogram in FIG. 9). For the purpose of processing signals it is possible to apply any time-frequency processing, for example the short-term Fourier transform, although due to their nonstationarity it is more convenient to apply the wavelet transform, in which the Morlet wavelet is used as a basic function.

Figure 10:
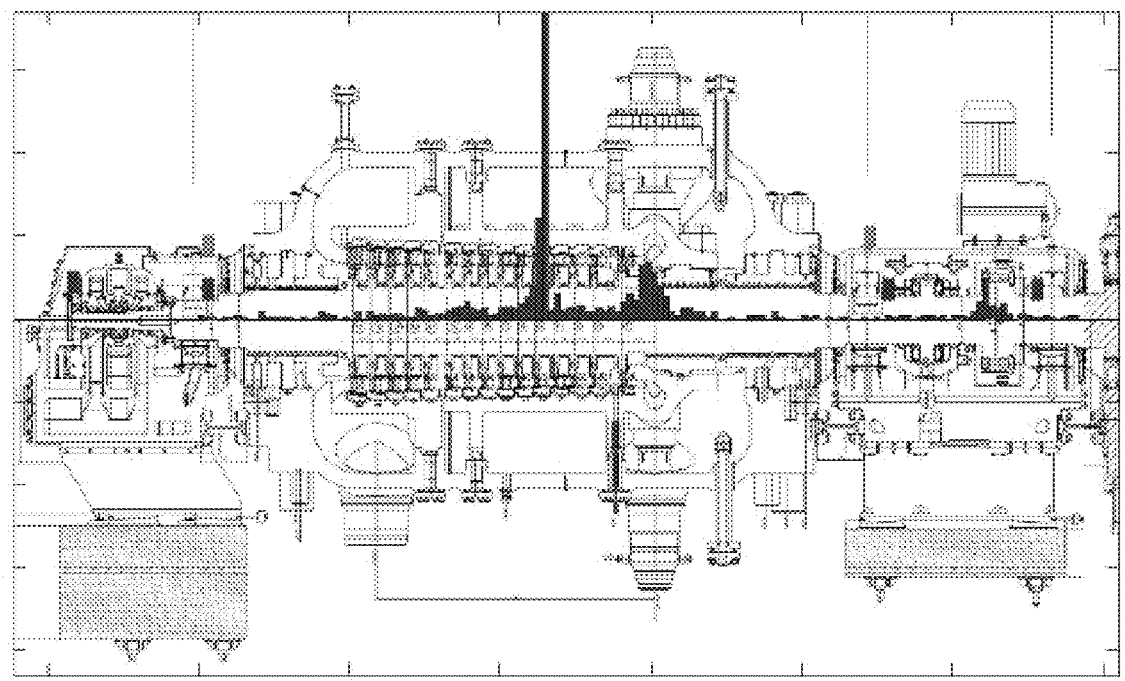
FIG. 10 represents an example of drawing of turbine with transferred histogram of absolute frequencies of rotor-stator rubbing.

The identification of the broadband amplitude changes (impacts) is followed by the identification of time of approach of these impacts to the individual sensors 2A, 2B and 20A, 20B of absolute vibrations of the bearings 2, 20 of the turbine—the so-called heel of the impact, which means identifying the moments of increases in the signal amplitude above the signal noise level. The knowledge of these heels of impacts and their mutual time differences thus enables—together with the knowledge of the distribution of the sensors 2A, 2B and 20A, 20B of absolute vibrations of the bearings 2, 20 in the turbine and the spreading speed of impact in the material of the rotor/stator—to carry out axial localization of the place/places of rotor-stator rubbing. During this localization several tens to hundreds of data indicating places of the beginning of rubbing in the turbine are acquired, whereby the data is graphically represented by means of a histogram of absolute frequencies in which on the x axis the axial distance of the sensors of absolute vibrations 2A, 2B and 20A, 20B of the bearings 2, 20 in the turbine is introduced. After its connection with the drawing of the particular turbine or its axis, the axial position of the places where rotor-stator rubbing occurred along the rotor 1 of the turbine becomes evident, whereby the places of frequent cases of rubbing are clearly distinguished from those of only intermittent or false detected cases of rubbing—see FIG. 10.

Figure 11:
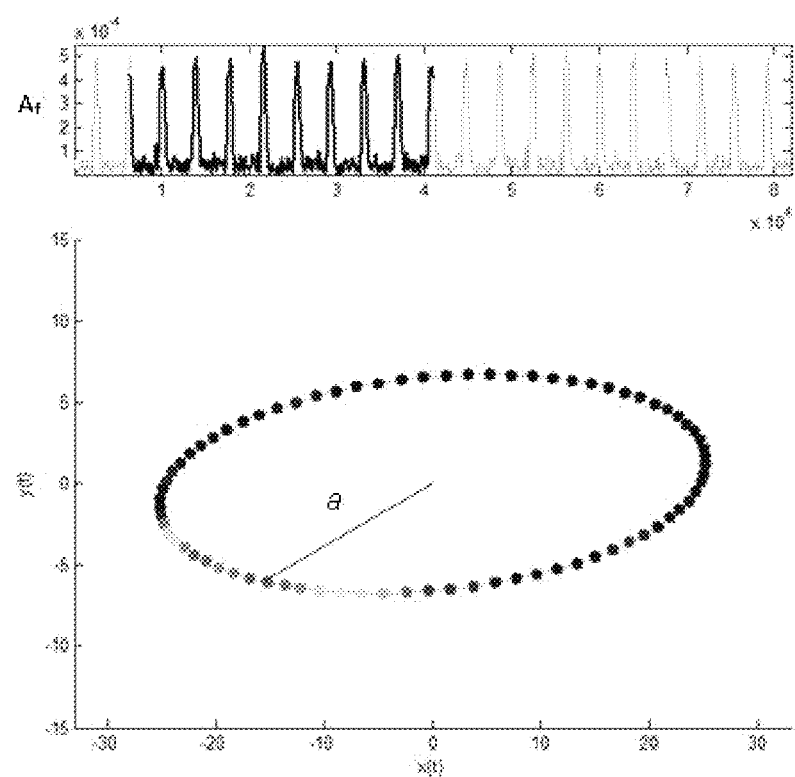
FIG. 11 represents an example of angular position of the maximum of amplitude changes caused by partial rotor-stator rubbing visualised in the orbit of the first harmonic component of the rotational frequency of the turbine rotor.

For more precise localization of the place/places where rotor-stator rubbing occurs, it is further possible to determine its/their circumferential location from the obtained data. At the same time by using the synchronically sampled signals of the sensors 3, 30 and 4, 40 of rotor vibrations and the signals of sensors 2A, 2B and 20A, 20B of absolute vibrations of the bearings, which are standard component of the field instrumentation of turbines, the angle of the shifting of the rotor 1 is identified, when rotor-stator rubbing occurs. Moreover, the amplitude changes (impacts) caused by rotor-stator rubbing are visualized in the orbit of the first harmonic component of the rotational frequency of the rotor 1, by which means the angular position of the maximum of these amplitude changes is determined, whereby the angular position represents the circumferential position of the place of rotor-stator rubbing—see the segment line a in FIG. 11.

What is claimed is:

1. A method of detecting and localizing partial rotor-stator rubbing during operation of a turbine, comprising:

monitoring a rotor of the turbine by at least one pair of sensors of rotor vibrations arranged in one plane of measuring perpendicular to an axis of the rotor and by at least one pair of sensors of absolute vibrations of bearings of the turbine, calculating an arithmetic mean of harmonic bands in full spectrum in a frequency domain using synchronically digitalized signals of the sensors of the rotor vibrations, converting information about subharmonic components of the harmonic bands and their multiples in full spectrum of the signals into a band −1X to 1X, where X indicates a rotational frequency of the rotor, calculating a median and estimating a level of signal noise, with which individual bands of the full spectrum are encumbered, and which is subtracted from amplitudes in the individual bands of the full spectrum of the signals of the sensors, determining a normalized accumulated full spectrum of the signals of the sensors of rotor vibrations, comparing the amplitude of predetermined subharmonic component/components of the signals of rotor vibrations with the amplitudes of frequency components in its proximity determined by the Fourier transform or by approximation using the Fourier series, based on visual and/or automatic analysis, deducing presence of a monitored subharmonic component of the signals of rotor vibrations in spectrum of the signals, and thereby determining an occurrence and location of rotor-stator rubbing, wherein axial localization sections of the signals of the sensors of the absolute vibrations of the bearings of the turbine are processed at a time of beginning of rotor-stator rubbing or during the rotor-stator rubbing in a time-frequency domain, in which the increases in broadband amplitude of the signals are identified and subsequently times of increase in broadband amplitudes of the signals above the signal noise are determined, and based upon the determined times and time variances, and distribution of the sensors of absolute vibrations of the bearings and a spreading speed of an impact in a material of the rotor-stator, determining an axial position of the rotor-stator rubbing by axial localization, and by comparison of a histogram of absolute frequencies of axial positions with the turbine axis, the axial position of the place/places where the rotor-stator rubbing occurs, and, for circumferential localization, increases in the amplitudes of the signals of the sensors of absolute bearing vibrations are visualized into an orbit of a first harmonic component of the rotational frequency of the rotor created from the signals of the sensors of rotor vibrations, thereby determining an angular position of the maximum of the increases in amplitudes caused by the rotor-stator rubbing, whereby the angular position corresponds to that of the place/places where the rotor-stator rubbing occurs.

2. The method according to claim 1, wherein the sensors of rotor vibrations are sensors of relative rotor vibrations.

3. The method according to claim 1, wherein the sensors of rotor vibrations are sensors of absolute rotor vibrations.

4. The method according to claim 1, wherein in visual analysis the amplitude of the predetermined subharmonic component/components of the signals of the rotor vibrations in the interval 1/9X to 1/2X is monitored, and compared with the amplitudes of the frequency components within its proximity, whereby in case the amplitude of this/these subharmonic component/components exceeds the amplitudes of surrounding frequency components, the presence of monitored subharmonic component/components in the spectrum of the signals of the sensors of the rotor vibrations is presumed, on the basis of which the occurrence of rotor-stator rubbing is detected.

5. The method according to claim 1, wherein, in automatic analysis a characteristic value of the subharmonic components having frequencies equal to integral fractions of the rotational frequency of the rotor is determined and defined by the relation $$\xi_{sf}(t) = \max\left[\frac{A_{caf}(t, -s_f)}{\frac{1}{M}\sum_{k=1}^{M} A_{caf}(t, -\tilde{f}_k)}, \frac{A_{caf}(t, s_f)}{\frac{1}{M}\sum_{k=1}^{M} A_{caf}(t, \tilde{f}_k)}\right]$$

where $A_{caf}(t, \pm s_f)$ is the amplitude of a normalized accumulated spectrum for the subharmonic frequency $s_f$ in the time t and $A_{caf}(t, \pm \tilde{f}_k)$ is the amplitude of a frequency line in proximity of this frequency, M is the overall number of frequency lines which are used for averaging, k is the index of the sum and $\tilde{f}_k$ is the value of the frequency line, which is located in the proximity of the subharmonic frequency $s_f$, whereby if rotor-stator rubbing does not occur and therefore neither the subharmonic component, nor its multiples are contained in the signals of rotor vibrations, a characteristic value of the given subharmonic component assumes the value close to 1, and if rotor-stator rubbing does occur, and, as a result, the subharmonic component, or its multiples are contained in the signals of the rotor vibrations, the characteristic value of the given subharmonic component exceeds 1.

6. The method according to claim 5, wherein the development of the characteristic value is approximated by summation the mean value μ and the standard deviation σ calculated by recursive algorithm in the form:

$$\mu(k)=\lambda\cdot\mu(k-1)+(1-\lambda)\cdot\xi_{sf}(k)$$

$$\sigma^2(k)\lambda\cdot^2(k-1)+(1-\lambda)\cdot[\xi_{sf}(k)-\mu(k)]^2,$$

where λ represents a forgetting factor and with respect to the sampling frequency of signal and the selected time constant t selected in most cases in the interval from 0.9 to 0.9999, k is a step and therefore it increases by 1 with every sample of signal, whereby from the change of the mean value μ and the standard deviation σ the occurrence of the rotor-stator rubbing is presumed.

7. The method according to claim 1, wherein in axial localization sections of the signals of the sensors of absolute vibrations of the bearings of the turbine are processed at the time of beginning of rotor-stator rubbing or during the rotor-stator rubbing, by a wavelet transform.

8. The method according to claim 7, wherein a Morlet wavelet is used as basic function of the wavelet transform.

* * * * *